No. 802,398. PATENTED OCT. 24, 1905.
J. D. JAMIESON.
HITCHING DEVICE.
APPLICATION FILED JUNE 19, 1905.

Witnesses
Jas. A. Koehl.
C. H. Griesbauer.

Inventor
J. D. Jamieson.
by H. R. Wilson
Attorney

UNITED STATES PATENT OFFICE.

JOHN D. JAMIESON, OF STILLWATER, MINNESOTA.

HITCHING DEVICE.

No. 802,398.     Specification of Letters Patent.     Patented Oct. 24, 1905.

Application filed June 19, 1905. Serial No. 266,061.

*To all whom it may concern:*

Be it known that I, JOHN D. JAMIESON, a citizen of the United States, residing at Stillwater, in the county of Washington and State of Minnesota, have invented certain new and useful Improvements in Hitching Devices; and I do declare the following to be a full, clear, and exact description of the invention, such as will enable others skilled in the art to which it appertains to make and use the same.

My invention relates to improvements in hitching devices, and more particularly to an attachment for vehicles whereby a hitching-weight may be lowered and raised to connect the same to the bit of a draft-animal and to relieve the animal of the weight.

The object of the invention is to provide a simple, inexpensive, and durable device of this character which may be readily applied to vehicles of any description and which will be well adapted for the purpose intended.

With the above and other objects in view the invention consists of certain novel features of construction, combination, and arrangement of parts, as will be hereinafter described and claimed.

Figure 1:
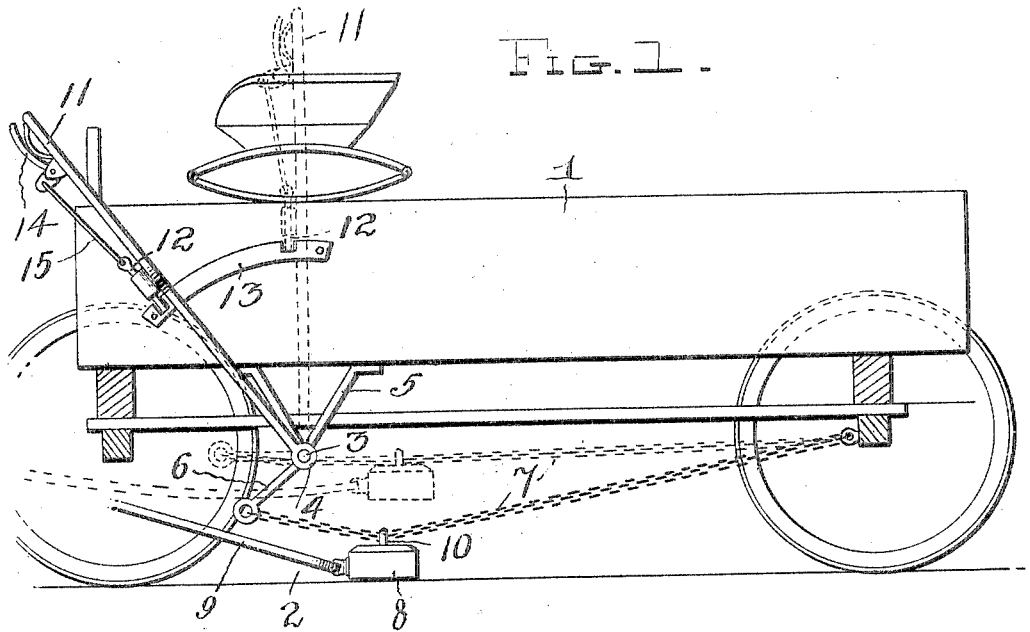
Figure 2:
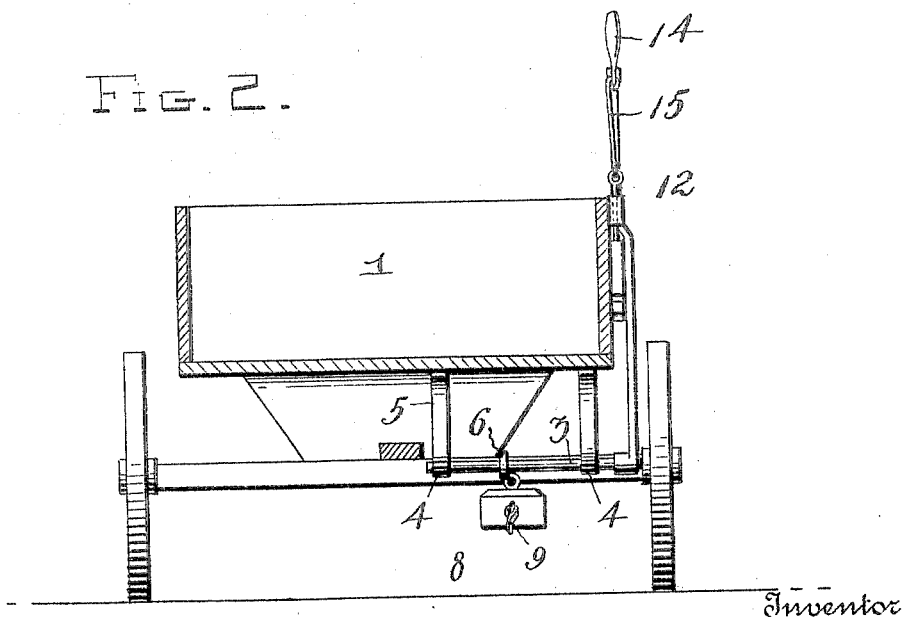

In the accompanying drawings, Figure 1 is a side elevation, with parts in section, of a vehicle with my improved weight-lifting attachment applied thereto; and Fig. 2 is a detail transverse sectional view through the vehicle.

Referring to the drawings by numeral, 1 denotes a vehicle of any description, to which my improved hitching device 2 is applied. The device comprises a rock-shaft 3, which is journaled in bearings 4, formed upon the lower ends of V-shaped brackets 5, which are bolted or otherwise secured upon the bottom of the body of the vehicle. Upon the rock-shaft 3 is provided a crank-arm 6, which has loosely connected to its outer end one end of a chain or other flexible connection 7, the opposite end of which latter is secured to the rear axle or to any other suitable portion of the vehicle. Slidably mounted upon the chain 7 is a hitching-weight 8, which is adapted to be connected by a strap or other flexible connection 9 to the bridle bit or bits of the draft animal or animals which are hitched to the vehicle. The sliding connection of the weight 8 upon the chain 7 is preferably effected by passing said chain through a ring 10, which is provided upon the top of the weight, as clearly shown in the drawings. Upon the outer end of the rock-shaft 3 is secured a hand-lever 11, which carries a spring-seated pawl 12, adapted to engage notches in a segmental locking bar or rack 13, which is secured upon one side of the vehicle-body. Said pawl 12 is adapted to be retracted from engagement with the notched bar 13 by the usual pivoted hand-piece 14, which is provided upon the upper end of the lever and connected to said pawl by a link 15.

The operation of the device will be readily understood. It will be seen that when the lever is in its elevated or upright position (shown in dotted lines in Fig. 1 of the drawings) the chain 7 will be stretched taut, so that the weight 8 will be supported above the ground and the strap 9 will be slack. When it is desired to bring the weight 8 into operation, the lever 11 is swung to its full-line position, (shown in Fig. 1 of the drawings,) so that the chain 7 will be slack and the weight 8 will rest upon the ground. It will be seen that upon the forward movement of the draft-animal and vehicle the chain 7 will slip through the ring 10 until the strap 9, which connects the weight to the animal's bit, is drawn taut, and the weight 8 will then check or arrest the animal. When the weight is upon the ground and the horse takes a backward step, the chain will pass through the ring 10 until the weight engages the rocker-arm 6, which will prevent the horse from becoming tangled with the strap.

While the device is particularly adapted for use upon express or delivery wagons, it will be understood that the same may be applied upon vehicles of any description.

Various changes in the form, proportion, and the minor details of construction may be resorted to without departing from the principle or sacrificing any of the advantages of this invention.

Having thus described my invention, what I claim as new, and desire to secure by Letters Patent, is—

1. A device of the character described comprising a rock-shaft, a crank-arm thereon, a flexible connection having one end attached to said crank-arm and its other end adapted to be connected to a vehicle, a weight slidably mounted upon said chain, a flexible connection having one end attached to said weight and its other end adapted for attachment to the bit of a draft-animal, and means for operating said shaft to raise and lower said weight.

2. A device of the character described comprising a rock-shaft, a crank-arm thereon, a flexible connection having one end attached to said crank-arm and its other end adapted to be connected to a vehicle, a weight slidably mounted upon said chain, a flexible connection having one end attached to said weight and its other end adapted for attachment to the bit of a draft-animal, a hand-lever upon said shaft, and means for locking said lever to hold said weight in an elevated or in a lowered position.

3. A device of the character described comprising a rock-shaft, a crank-arm thereon, a flexible connection having one end attached to said crank-arm and its other end adapted to be connected to a vehicle, a weight slidably mounted upon said chain, a flexible connection having one end attached to said weight and its other end adapted for attachment to the bit of a draft-animal, a hand-lever upon said shaft, a segmental rack, and a pawl upon said lever adapted to engage said rack to lock said lever against movement, substantially as described.

4. The combination with a vehicle, of a weight-lifting attachment therefor comprising bearing-brackets secured upon said vehicle, a rock-shaft journaled in said brackets, a crank-arm upon said rock-shaft, a weight, an eye upon said weight, a chain or other flexible connection passed through said eye and having one of its ends attached to said crank-arm and its other end to said vehicle, a strap or other flexible connection having one end attached to said weight and its other end adapted for attachment to the bit of a draft-animal, a lever upon said rock-shaft, and means for locking said lever in an adjusted position, substantially as described.

In testimony whereof I have hereunto set my hand in presence of two subscribing witnesses.

JOHN D. JAMIESON.

Witnesses:
M. E. SULLIVAN,
WM. B. HALL.